(12) United States Patent
Biskeborn et al.

(10) Patent No.: US 8,014,100 B2
(45) Date of Patent: Sep. 6, 2011

(54) PLANAR SERVO WRITE HEAD

(75) Inventors: Robert Glenn Biskeborn, Hollister, CA (US); Wayne Isami Imaino, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 11/744,535

(22) Filed: May 4, 2007

(65) Prior Publication Data

US 2008/0273264 A1  Nov. 6, 2008

(51) Int. Cl.
*G11B 5/17* (2006.01)
*G11B 5/187* (2006.01)
*G11B 5/265* (2006.01)
*G11B 5/23* (2006.01)
*G11B 5/147* (2006.01)

(52) U.S. Cl. ........... 360/123.6; 360/125.35; 360/125.36; 360/125.37

(58) Field of Classification Search ............. 360/125.34, 360/125.35, 125.36, 125.37, 123.14, 123.19, 360/123.59, 123.6
See application file for complete search history.

(56) References Cited

U.S. PATENT DOCUMENTS

| | | | | |
|---|---|---|---|---|
| 4,949,207 A * | 8/1990 | Lazzari | ..................... | 360/125.34 |
| 5,167,062 A * | 12/1992 | Castera et al. | ............. | 29/603.14 |
| 5,274,520 A * | 12/1993 | Matsuzono et al. | ....... | 360/318.1 |
| 5,572,392 A * | 11/1996 | Aboaf et al. | ............. | 360/125.35 |
| 5,742,452 A * | 4/1998 | Simmons et al. | .......... | 360/246.1 |
| 5,745,329 A * | 4/1998 | Lehureau | ................. | 360/125.36 |
| 5,920,762 A * | 7/1999 | Simmons et al. | ................. | 438/3 |
| 6,212,034 B1 * | 4/2001 | Fedeli et al. | ............. | 360/125.34 |
| 6,388,846 B1 * | 5/2002 | Albertini et al. | ........... | 360/318.1 |
| 6,665,143 B2 * | 12/2003 | Yoda et al. | ............... | 360/119.11 |
| 6,947,256 B2 * | 9/2005 | Biskeborn et al. | ........ | 360/125.34 |
| 7,095,585 B2 * | 8/2006 | Payne et al. | ............. | 360/125.35 |
| 7,800,862 B1 * | 9/2010 | Dugas et al. | ............. | 360/119.06 |
| 2003/0189788 A1 | 10/2003 | Kamijima | .................. | 360/123.2 |
| 2004/0179295 A1 | 9/2004 | Sato | .......................... | 360/123.4 |
| 2005/0094315 A1 * | 5/2005 | Payne et al. | .................... | 360/125 |

FOREIGN PATENT DOCUMENTS

EP  1381031 A  1/2004

OTHER PUBLICATIONS

Definition of "contour", Oxford English Dictionary Online, Oxford University Press 2009 (retrieved Aug. 25, 2010).*

* cited by examiner

*Primary Examiner* — Julie Anne Watko
(74) *Attorney, Agent, or Firm* — Jeffrey P. Aiello (57) ABSTRACT

A servo write head that provides fast servo pattern writing and improved tape manufacturing speed is provided. The write head may be fabricated using thin-film fabrication techniques. A coil is formed on a bottom pole of the write head. The coil has a plurality of turns that enable the write head to generate a magnetic field sufficient for writing data with reduced current. The inductance of the coil is reduced due to its small dimensions. Reduced inductance of the coil may enable increased switching frequency of the write head, allowing data to be written at a higher frequency. The write head includes a planar top pole coupled to the bottom pole. The top pole has more than one write gap is formed therein.

9 Claims, 8 Drawing Sheets

PLANAR SERVO WRITE HEAD

BACKGROUND OF THE INVENTION

1. Field of the Invention

The present invention relates to magnetic tape heads, and more particularly, to a planar servo write head for flexible magnetic storage media.

2. Background Information

Linear recording media, such as magnetic tapes, store data on linear data tracks that run parallel to each other over the length of the media. The magnetic media, or tape, is moved across a magnetic tape head for reading data stored on the tape and writing data to the tape. For throughput, tape heads write eight or more tracks simultaneously.

As the tape runs transversely across the magnetic tape head, the tape may move laterally relative to the head. This lateral movement of the tape may result in the head reading or writing data off track or on the wrong track. Thus, accurate positioning of the tape head relative to the tape is critical.

To enable accurate positioning of the tape head, media manufacturers may write servo tracks on the magnetic tape parallel to the data tracks. Servo readers in the tape head read the servo information in the servo tracks. The servo information is then used for aligning transducers in the head with data tracks on the tape. The servo information is also used for deriving tape velocity and for data channel timing recovery. The servo information may also include the longitudinal position of the tape, manufacturers' data, and servo-band or data-band identification. This additional data is typically encoded using phase modulation.

Figure 1:
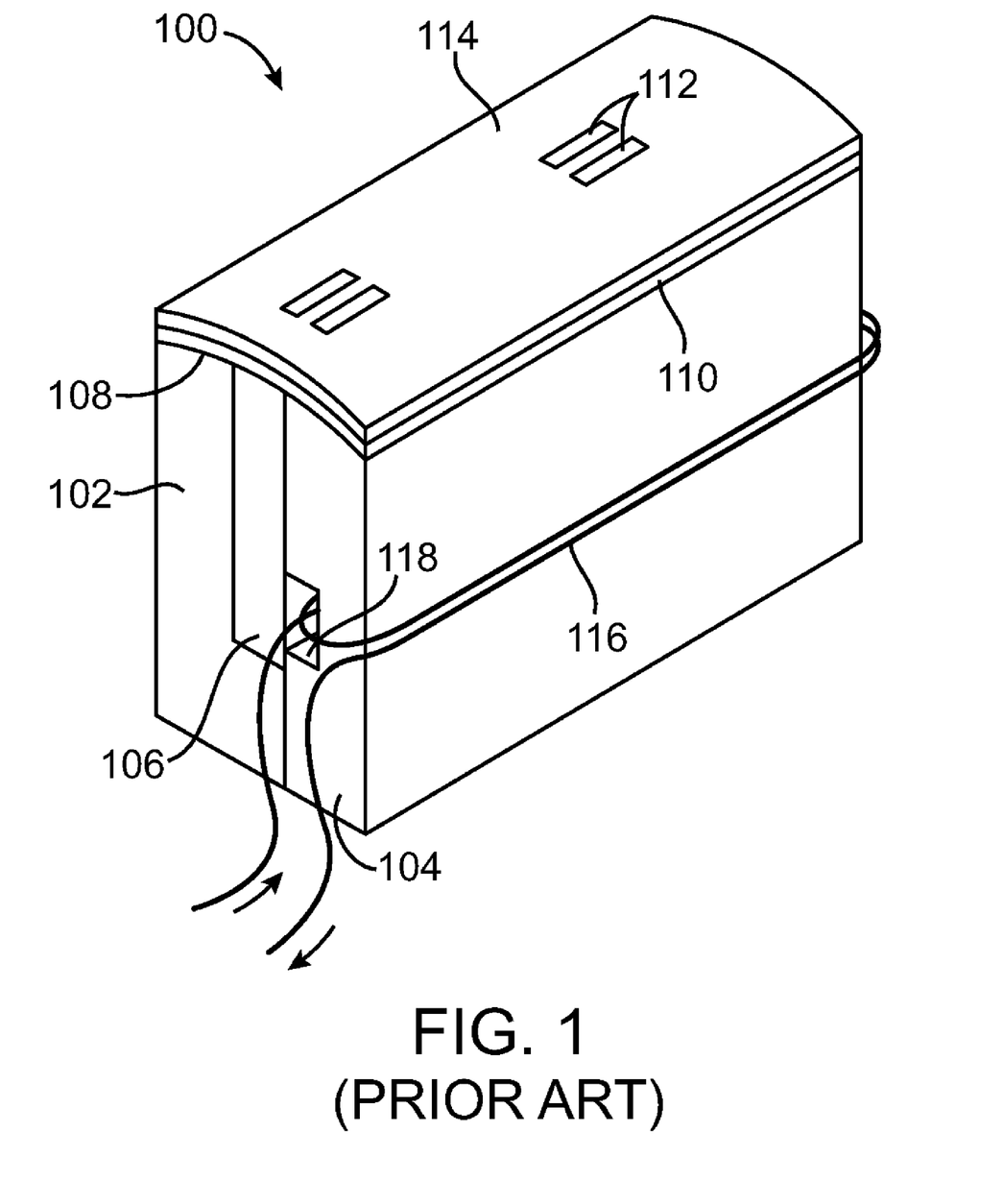
FIG. 1 is a perspective view of an exemplary prior art servo write head.

Servo tracks are typically written to the magnetic tape during manufacture of the tape by heads, known as servo write heads, that are dedicated to writing servo patterns. An exemplary prior art servo write head 100 is shown in FIG. 1 of the drawings. The servo write head 100 may be constructed from two blocks 102, 104 that typically comprise magnetic ferrite. The blocks may be separated by a glass spacer 106 and are bonded to the spacer. The head 100 is then lapped to form a top surface 108 of a desired contour.

A magnetic seed layer 110 is then deposited on the top surface 108. A photoresist layer may then be deposited on the seed layer 110 and patterned to form the desired write gaps 112. The fabrication techniques and processes used to fabricate known servo write heads limits minimum achievable write gaps to approximately 0.5 to 1 micrometers.

As data track density on magnetic tape increases, data track width decreases. Track following errors must also decrease. Thus, increasing servo pattern linear density is required. Resultantly, write gap widths from about 0.5 to 1 micrometers are too large for future servo pattern writing requirements due to narrower data tracks.

After the write gaps are formed, a layer of magnetic material several microns thick 114 is plated on the seed layer 110, with the write gaps extending though the magnetic layer. A wear-resistant overcoat may be deposited over the magnetic layer.

A coil 116 is wound around one of the blocks through a slot 118 that passes though the head. The coil typically has one to three coil turns that wind about the block. Electrical current is applied to the coil to create a magnetic field in the write gaps of the head. Several amperes of current are applied to the coil to generate enough magnetic field to write the servo patterns. The magnetic field sets the magnetization in the tape as it runs across the tape bearing surface, thus writing the servo patterns on the tape.

A disadvantage of the prior art head is that the large yoke structure has a very large inductance "L". Since the response time of the head is L/r, where "r" is the series resistance, the larger inductance creates a longer rise time. Long rise time limits how fast the tape can be moved during servo pattern writing. This limits the speed that servo patterns can be written to the tape, limiting manufacturing speed of the tape. The inductance itself is proportional to $N^2$, where N is the number of coil turns of the head. Thus, to keep inductance down, N is limited to one to three coil turns. However, this results in a requirement for larger currents flowing through the coil.

Accordingly, there is a clearly-felt need in the art for a servo write head that provides faster servo pattern writing and faster tape manufacturing speed, and has write gaps of a reduced width. These unresolved problems and deficiencies are clearly felt in the art and are solved by this invention in the manner described below.

SUMMARY OF THE INVENTION

An embodiment of the invention comprises a servo write head that enables faster servo pattern writing and thus faster tape manufacturing speed. The servo write head may be fabricated using thin-film fabrication techniques.

An embodiment of the servo write head includes a magnetic bottom pole with a conductive coil and a magnetic top pole coupled to the bottom pole. The coil has a plurality of turns that wind around the bottom pole. The top pole is formed with a planar tape bearing surface that has at least one write gap formed therein. Alternatively, the write gaps may be formed by disposing pole islands between segments of the top pole. The pole islands may be formed of materials having a relatively high magnetic moment.

The write gaps are defined using thin-film fabrication techniques to provide gaps having a reduced width as compared to known write heads. In an embodiment of the write head, write gaps having a width of less than about 0.5 micrometers are formed. In another embodiment the width of the write gaps may be about 0.2 to 0.3 micrometers. The narrower write gaps enable writing sharp transitions to a magnetic data storage media, such as a magnetic data storage tape. This allows for improved reading of the information written to the tape by the invented head, such as servo information. The write gaps may be formed in any suitable pattern, such as a chevron pattern, for writing servo data.

The multi-turn coil enables generating a magnetic field sufficient for writing data with reduced current. Current in the range of 10 milliamps to 50 milliamps is sufficient for writing data. Performing write data operations with reduced current applied to the coil may increase the switching frequency of the write head, allowing data, such as servo data, to be written at a higher frequency. Further the invented write head has an inherently lower inductance magnetic core, which enhances the frequency response of the head.

DESCRIPTION OF THE PREFERRED EMBODIMENTS

Figure 2:
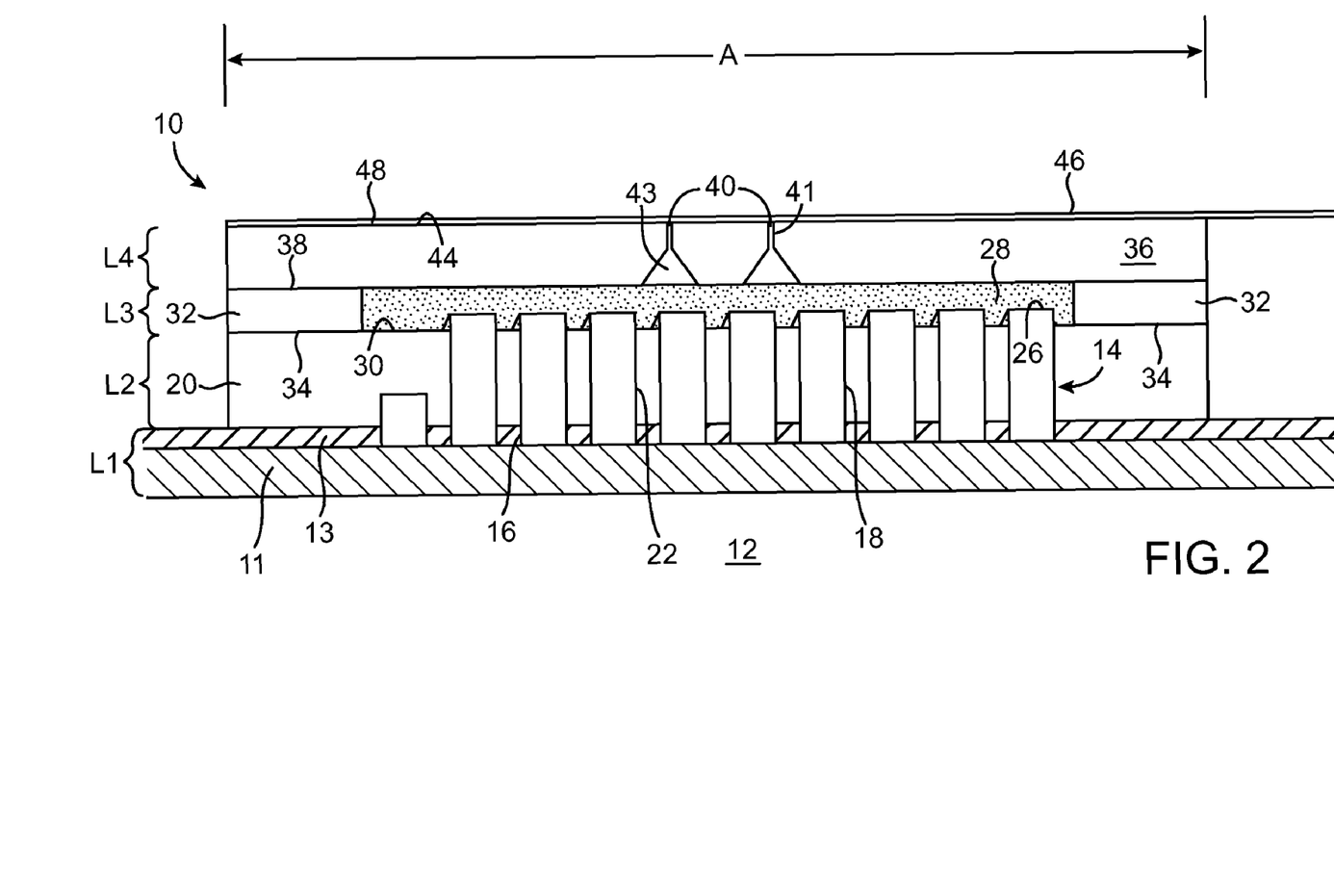
FIG. 2 is a side elevation view of an exemplary embodiment of a servo write head of the present invention.
Figure 3:
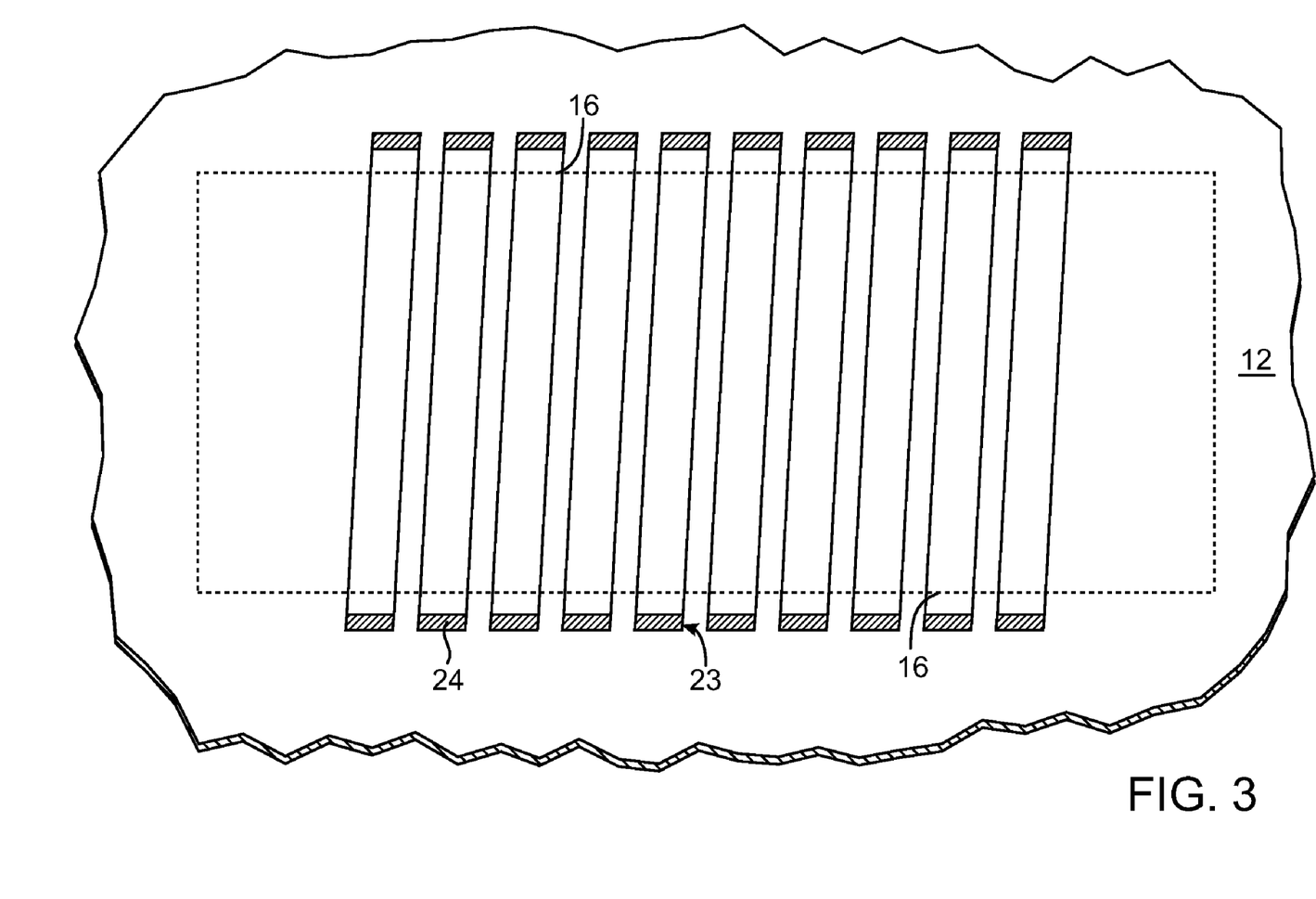
FIG. 3 is a top plan view showing a fabrication step of the exemplary embodiment of the servo write head of the invention.
Figure 4:
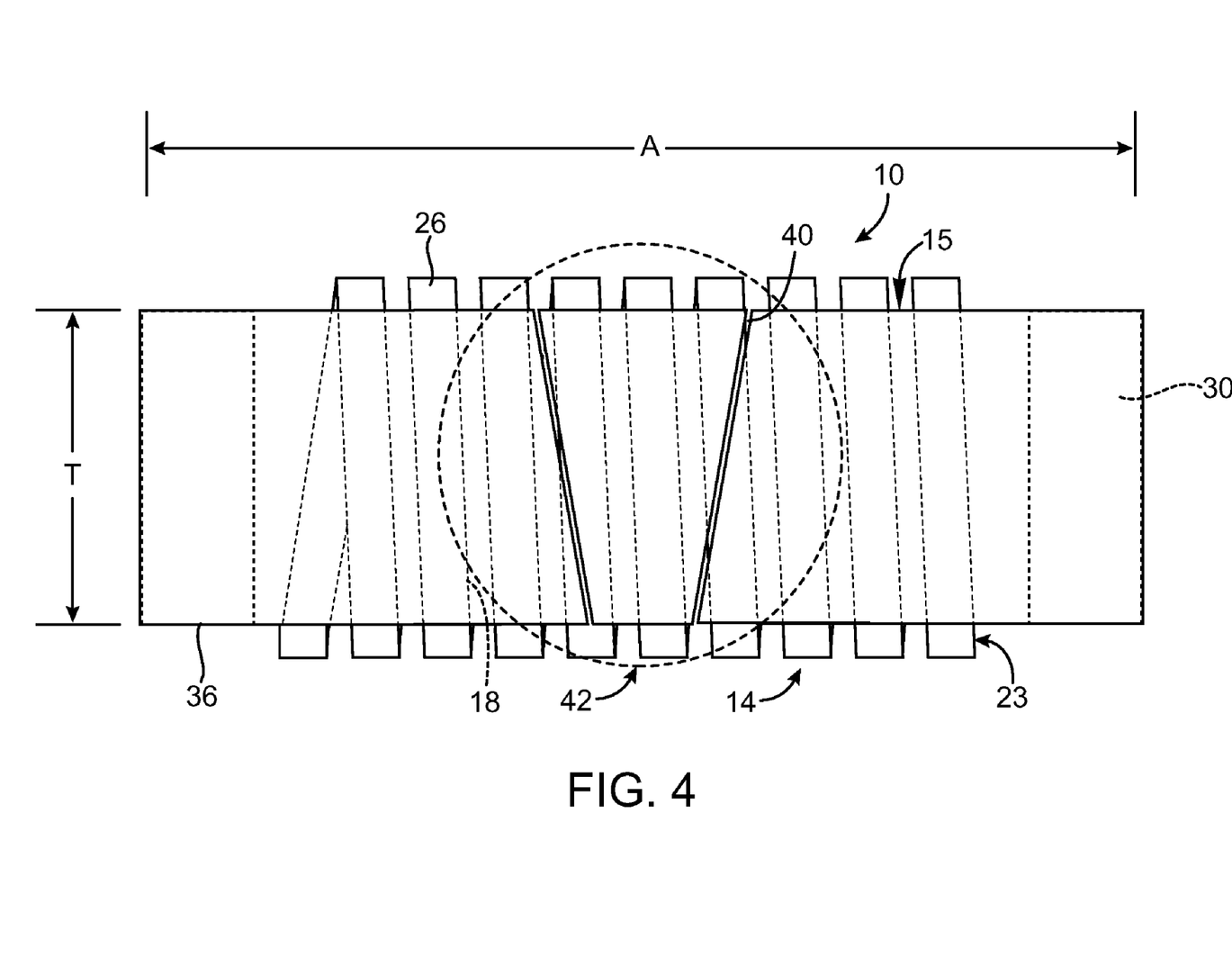
FIG. 4 is a top plan view of an exemplary embodiment of the servo write head of the invention.

Referring to FIG. 2 through FIG. 4 of the drawings, there is shown an exemplary embodiment of a servo write head. The servo write head 10 enables fast servo pattern writing and improved tape manufacturing speed.

The servo write head 10 may be fabricated using known processes. The write head 10 is fabricated using techniques common to both hard disk drive head and semiconductor industries, such as thin-film fabrication techniques. Building the servo write head 10 using thin-film fabrication techniques may provide several advantages over other known methods for fabricating servo write heads. Building servo write heads using thin-film techniques enables these write heads to be built on AlTiC (Aluminum-Titanium-Carbon) wafers or on silicon wafers, which may reduce the costs associated with manufacturing the heads. Also, servo write heads built on a silicon wafer may be integrated with other active devices on the wafer. Additionally, fabricating servo write heads using thin-film techniques may enable these write heads to be built at a single processing location, which can reduce the costs associated with manufacturing these heads. Further, a servo write head having reduced dimensions is achievable using thin-film fabrication techniques.

The servo write head 10 may be fabricated in layers as is common to thin-film fabrication. A substrate 12, that the head 10 is fabricated on may comprise any suitable material, such as silicon. A first layer L1 of the head 10 includes a layer of insulation 11 that is disposed on the substrate 12. The layer of insulation 11 may comprise $SO_2$ or $AL_2O_3$, for example.

A portion of a coil 14 is then formed on the insulation 11. The coil 14 may comprise a known configuration, such as a helical coil or a pancake coil configuration (not shown). In the embodiment shown in the Figures, the coil 14 is helical. A conducting bar 16 of each of a plurality of coil turns 18 of the coil 14 are then formed on the insulation 11. The conducting bars 16 may comprise a conductive material, such as copper. The bars 16 are formed by the known process of electroplating and patterning. The conducting bars 16 are aligned generally diagonally to a longitudinal axis A of the head 10, to form the helical coil 14. In the exemplary embodiment shown in the drawings, ten coil turns 18 are shown. However, it is to be understood that the plurality of turns 18 may range from about three to more than twelve turns 18. The coil 14 turns pitch may be about 3.0 µm or less, while the width of the coil turns 18 is typically not less than about 1 µm. There may be a gap 15 of about 0.5 µm to 1.0 µm between adjacent coil turns 18. A second layer of insulation 13 is then disposed over the conducting bars 16 and etched. The second layer of insulation 13 may comprise $SO_2$ or $AL_2O_3$ as discussed.

A next layer L2 of the head 10 comprises a bottom pole 20 that is formed over the conducting bars 16 of the turns 18 and second insulation layer 13, by disposing the material comprising the bottom pole 20. The bottom pole 20 may comprise a magnetic alloy having a high magnetic permeability. In one embodiment, the bottom pole 20 comprises a magnetically permeable material of the type conventionally used to fabricate inductive write heads for information storage, such as Permalloy, that comprises 19% iron and 81% nickel. The Permalloy may be plated and patterned using well known processes and techniques.

In an exemplary embodiment, the bottom pole 20 may range in thickness from about 3 µm to about 5 µm. In one embodiment, the width of the pole 20 may substantially equal the width of a track of a tape where servo information (servo track width), is written (more thoroughly discussed hereinafter). Alternately, the width of the pole 20 may be greater than the servo track width to help ensure that it does not saturate at the current needed to write servo information to the media.

A vertical segment 22 of each turn 18 may be formed on an insulation layer 28 that is formed on an upper surface 30 of the bottom pole 20. The insulation layer 28 may comprise a suitable non-electrically conductive material, such as alumina, aluminum oxide, or photoresist. A conductive metal is plated on an exposed end 24 (shown in FIG. 3) of each conductive bar 16 through a via 23 to form each vertical segment 22. The metal may be plated on each bar portion 16 to a depth approximately equal to a height of the bottom pole 20 plus the thickness of the insulation layer 28.

On a next layer L3 of the head 10, a top portion 26 of each coil turn 18 is formed. The top portion 26 of each coil turn 18 may be formed on the insulation layer 28. The top portion 26 of the coil turns 18 may be formed in a manner similar to forming the conducting bars 16. The top portion 26 of each coil turn 18 may extend across the insulation layer 28 and between opposing vertical segments 22, for coupling the top portion 26 to the segments 22, to complete the helical coil 14. The conductive metal comprising the coil 14 is plated to form the top portion 26 of the coil turns 18 to complete the coil 14.

A pole magnetic yoke segment 32 may be formed on each end 34 of the bottom pole 20 adjacent to the coil 14. The pole magnetic yoke segments 32 are formed by etching the insulating layer 28 at each end 34 of the bottom pole 20, to expose the ends 34. The material comprising the segments 32 may then be plated or otherwise formed on the exposed ends 34. The height of pole segments 32 is determined, in part, by the thickness of the top bars 26 of the coil 14. In an exemplary embodiment, the height of the pole segments 32 is about 3 µm to 5 µm. However, the height of the segments 32 may be more or less, depending upon the thickness of the bars 26. The width of the segments 32 may be substantially similar to the width of the bottom pole 20. The configuration of the pole segments 32 prevents magnetic saturation in this region of the head 10. The pole segments 32 comprise a magnetically permeable material, such as Permalloy. In one embodiment, the segments 32 comprise the same magnetic alloy that the bottom pole 20 comprises.

Referring to FIG. 2 and FIG. 4, a next layer L4 of the servo write head 10 comprises a top pole 36 that is formed on the pole segments 32 to provide a complete magnetic circuit. The top pole 36 preferably comprises a material having a high magnetic moment. For example, the top pole 36 may comprise a nickel-iron alloy that contains approximately 45% nickel and 55% iron.

The top pole 36 is formed by first disposing and patterning a mask layer over a top surface 38 of the pole segments 32 and insulating layer 28. The mask layer is patterned and etched to form at least one write gap 40 in the top pole 36. The top pole 36 is dimensioned so that its width is about equal to the servo track width, where the head 10 will be writing servo data. The bottom pole 20 may be wider than the top pole to help insure that the bottom pole 20 does not saturate before the top pole 36. The width of the top pole 36 may range from about 10 μm to more than 185 μm, depending upon the selected application and servo track width. The top pole 36 may range in thickness from approximately 1 μm to 5 μm.

In the exemplary embodiment, two write gaps 40 are shown to be formed on the top pole 36 of the servo write head 10. Although two write gaps 40 are shown in the write head 10 in FIG. 2, the head 10 may include two or more write gaps 40. The write gaps 40 may be formed in any suitable pattern. For example, the write gap 40 may be positioned at an angle relative to a transverse axis T of the head 10, for writing time-based servo patterns. The write gaps 40 may be patterned to form an angle with the transverse axis T from approximately 6° to approximately 25°, depending upon the selected application of the head 10.

Preferably, the write gaps 40 are formed in a pattern desirable for writing servo data, such as a chevron pattern shown generally at 42. Since the write gaps 40 are formed using thin-film techniques, the gaps 40 of the exemplary embodiment have reduced width compared to the write gaps of known servo write heads.

In one embodiment, each write gap 40 is patterned with a narrow region 41 located adjacent to a tape bearing surface 46 of the head 10 and a widened portion 43. The widened portion 43 of the write gap 40 focuses magnetic flux flowing across the gap 40 through the narrow region 41 of the gap 40, to efficiently write data.

The reduced width of the narrow region 41 of the write gaps 40 may enable sharp transitions when writing data, such as servo pattern data, which provides improved signals for reading the servo data written by the head 10. In the exemplary embodiment, the height of the narrow region 41 of the write gaps 40 is less than about 0.5 micrometers. In a preferred embodiment, the width of the narrow region 41 of the write gaps 40 may be about 0.3 micrometers.

A top surface 44 of the top pole 36 may be formed generally planar to provide the planar tape bearing surface 46. The top surface 44 may be planarized using known methods, such as by lapping or Chem-mechanical polishing (CMP), for example. In one embodiment, CMP, or other planarization technique used in semiconductor fabrication, is used for planarizing the top surface 44 of the top pole 36. Planarizing the top surface 44 using a planarization technique common to semiconductor fabrication may reduce the costs associated with fabricating the head 10.

Optionally, a layer of a wear resistant material 48 may be disposed over the top surface 44 of the top pole 36. The layer wear resistant material 48 would be provided to increase the life of the invented head 10. The wear resistant material may comprise any suitable material known in the art, such as diamond-like carbon, for example.

Figure 5:
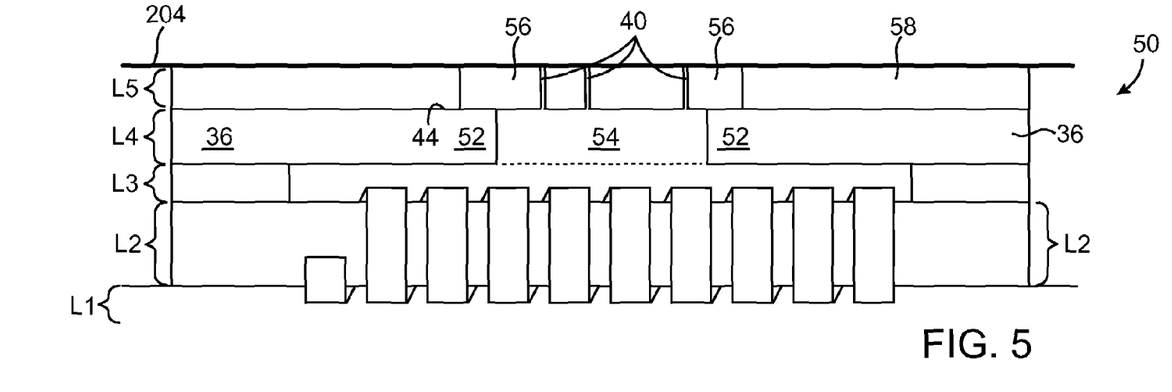
FIG. 5 is side elevation view of the alternative embodiment of the servo write head of the invention.
Figure 6:
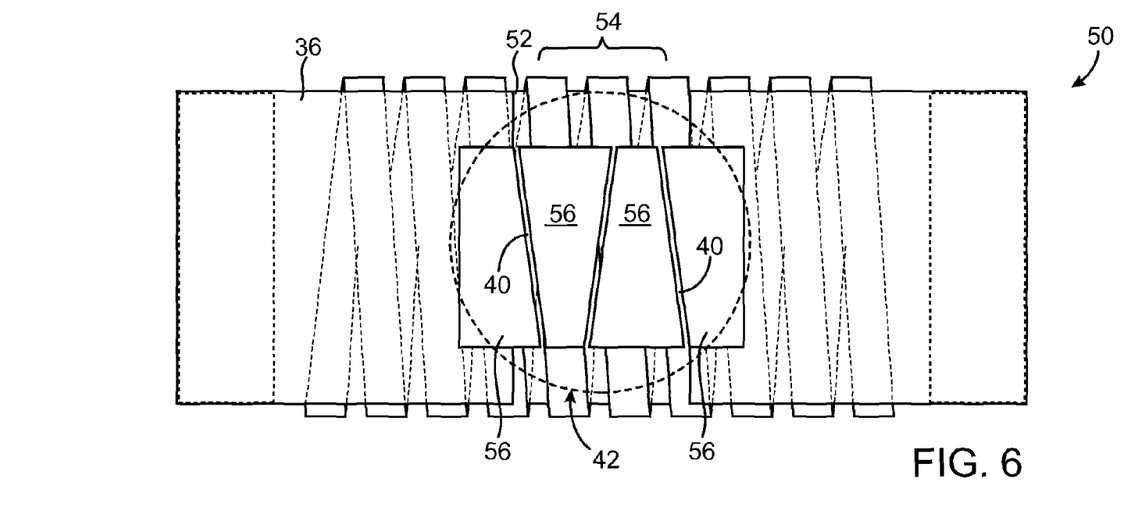
FIG. 6 is a top plan view of the alternative embodiment of the servo write head of the invention.

Referring to FIG. 5 and FIG. 6, there is shown an alternative embodiment 50 of the servo write head, where the top pole 36 is formed with opposing end portions 52. In this embodiment, the top pole 36 comprises a magnetically permeable material, comprising about 20% iron and 80% nickel. The end portions 52 are formed such that there is a substantial gap 54 between the end portions 52. The top surface 44 of the top pole 36 is planarized, as discussed previously.

On a next layer L5, pole islands 56 are formed on the top surface 44 of the top pole 36 to provide the write gaps 40. The pole islands 56 preferably comprise a ferromagnetic material having a high magnetic moment, optimal for writing data. In an exemplary embodiment, the pole islands 56 comprise an alloy of about 45% Nickel and 55% Iron. The pole islands 56 may comprise materials having a magnetic moment of about 2.0 Tesla or greater.

The islands 56 may be formed by disposing a mask layer 58 on the top surface 44, then patterning and etching the mask layer 58. The high magnetic moment pole material is then disposed on the top surface 44 forming the islands 56, with write gaps 40 being defined between adjacent islands 56. A number of islands 56 may be formed, to achieve a desired number of write gaps 40. Typically two or more write gaps 40 are formed in a chevron pattern 42, as previously discussed. In this embodiment the write gaps 40 are formed with a uniform width. Since the islands 56 are formed using thin-film techniques, the narrow region 41 of the write gaps 40 of this embodiment may be less than approximately 0.5 micrometers.

To increase the strength of the magnetic field across the write gaps 40, for improved servo track writing, the coil turns 18 may be positioned as close as possible to the bottom surface of the top poles 36.

Figure 7:
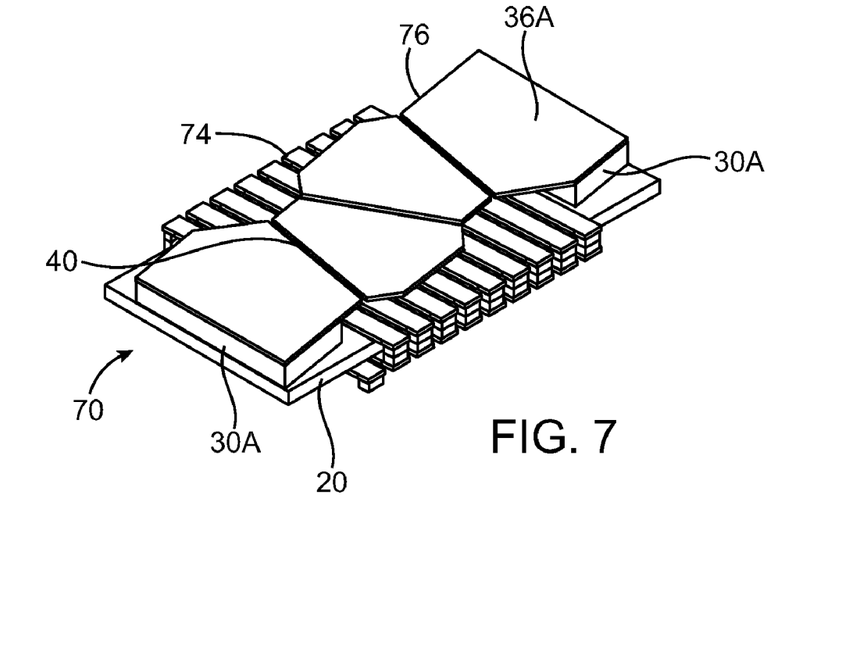
FIG. 7 is a top plan view of another alternative embodiment of the servo write head of the invention.
Figure 8:
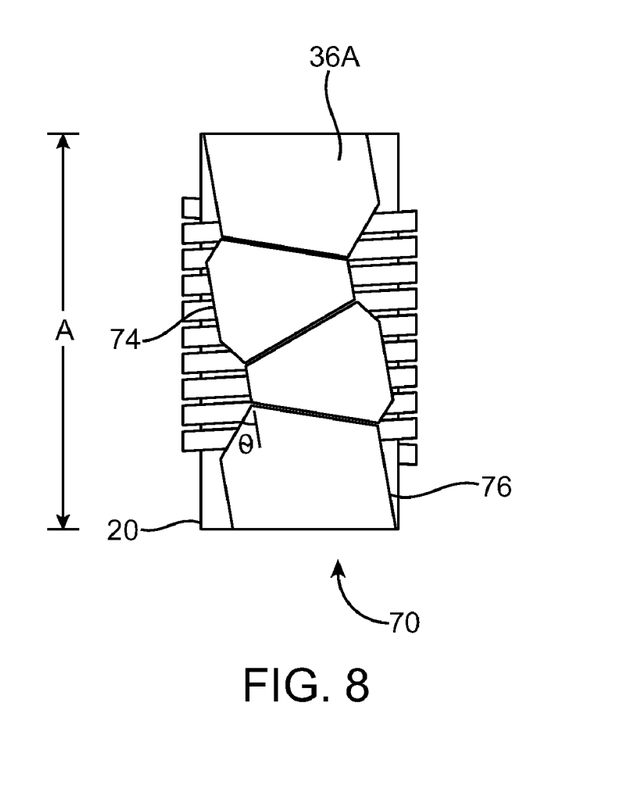
FIG. 8 is a perspective view of the other alternative embodiment of the servo write head of the invention.

In another embodiment, shown in FIG. 7 and FIG. 8, a top pole 36A is formed at an angle to the longitudinal axis A of the head 70. The top pole 36A of the head 70 extends at an angle relative to the longitudinal axis A for reducing the reluctance between the bottom pole 20 and top pole 36A. to provide a more uniform gap fringing field.

In the embodiment of FIGS. 7 and 8, pole segments 30A are formed on the bottom pole 20 and comprise Permalloy, as previously discussed. However, the pole segments 30A are etched such that each pole segment 30A offset relative to the longitudinal axis A, so that the top pole 36A is positioned at an angle to the longitudinal axis A when formed.

The top pole 36A is then formed on the pole segments 30A and nonconductive layer 28 (shown in FIG. 2) as discussed and preferably comprises a material having a high magnetic permeability. For example, the top pole 36A may comprise an alloy of approximately 45% nickel and 55% iron.

In the embodiment of FIGS. 7 and 8, the top pole 36A may be formed with more than one write gap 40 therein. The top pole 36A is positioned at an angle to the longitudinal axis A, so that the write gaps 40 form a reduced angle with the longitudinal axis A of the head 70. Reducing the angle that the write gaps 40 form with the longitudinal axis A of the head 70 may provide more uniform magnetic reluctance across the width of the write gaps 40, which may provide a more uniform gap fringing field.

To provide a symmetrical gap field at the ends of the write gaps 40, the top pole 36A of the embodiment of the head 70 is configured with protuberances 74 along each side 76 of the pole 36A to form an angle θ with the write gaps 40. In one embodiment, angle θ is twice the write gap angle.

Figure 9:
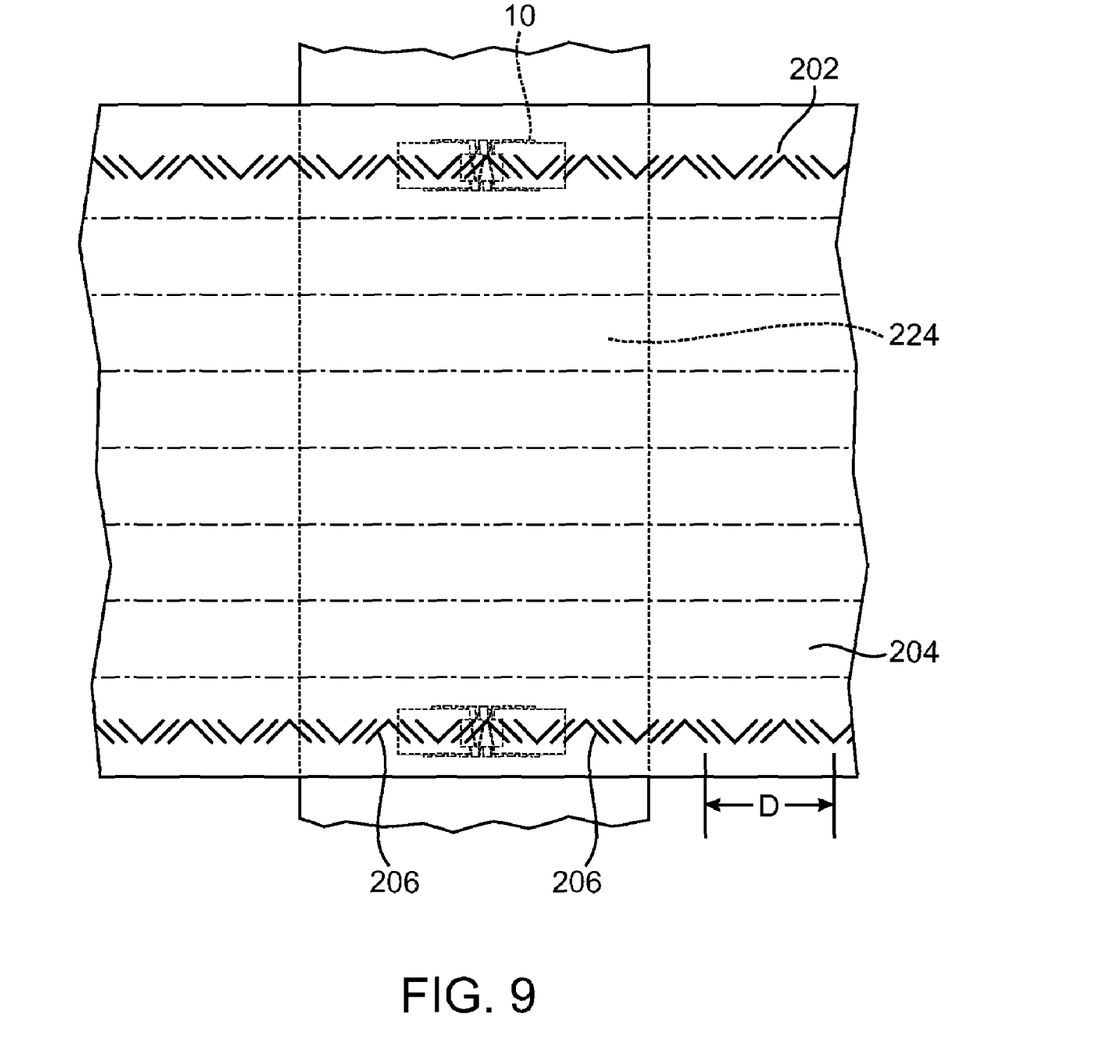
FIG. 9 is a partial plan view showing the servo write head of the invention in communication with a magnetic data storage tape.
Figure 10:
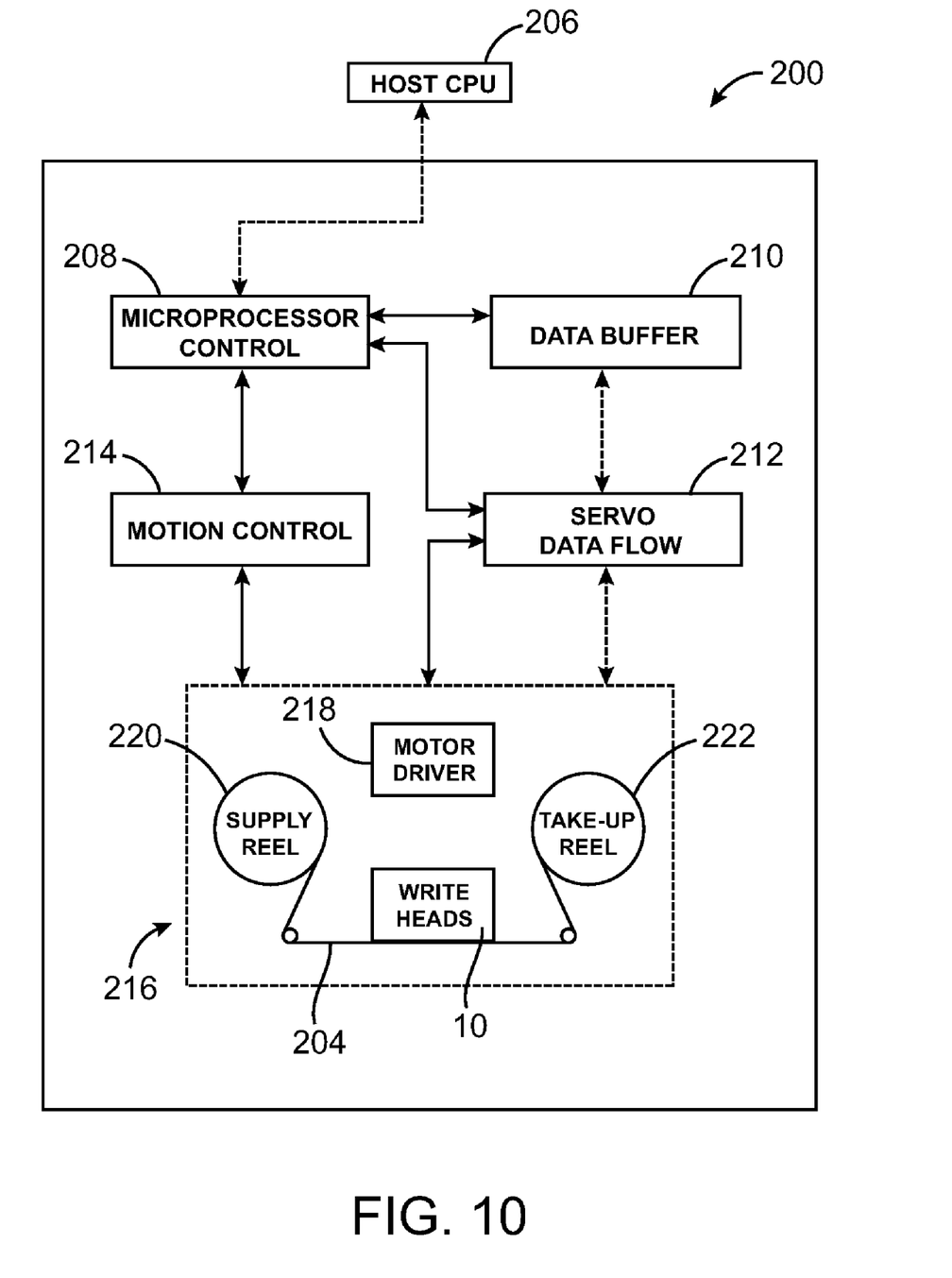
FIG. 10 is a functional block diagram showing a data writing apparatus adapted for use with the servo write head of the present invention.

Referring to FIG. 9 and FIG. 10, the inventive concepts described herein may be embodied in an apparatus 200 for writing data, such as servo control data 202 to a tape 204. The apparatus 200 is preferably configured for writing servo data 202 to a magnetic tape 204 during manufacture thereof. The servo data writing apparatus 200 may be coupled to a host computer 206 for receiving instructions therefrom.

The apparatus 200 includes plural components that provide control of writing servo control data 202 to the magnetic tape 204, during manufacture. By way of example only, those components may conventionally include a microprocessor controller 208, a data buffer 210, a servo write data flow circuit 212, a motion control system 214, and a tape interface system 216 that includes a motor driver circuit 218 and one or more of the invented servo write heads 10.

The microprocessor controller 208 provides overhead control functionality for the operations of the apparatus 200. When writing servo data 202 to the tape 204, the controller 208 communicates with the host 206 for sending servo data to the data buffer 210 that stores the data for subsequent writing. The data buffer 210 in turn communicates the data block received from the host 206 to the data flow circuit 212, which formats the data 202 into physically formatted data that may be written to the magnetic tape 204. The formatted physical data is then communicated to the tape interface system 216 from the data flow circuit 212.

The tape interface system 216 includes one or more servo write heads 10 described herein. The interface system 216 also includes drive motor components (not shown) for performing forward and reverse movement of the tape 204 which is mounted on a supply reel 220 and a take-up reel 222. The drive components of the tape interface system 216 are controlled by the motion control system 214 and the motor driver circuit 218, for moving the tape 204 transversely across a tape bearing surface 224 when writing servo data 202 to the tape 204.

The servo data 202 written to the tape 204 produces peaks in a read-back signal when the servo data 202 is read by another device (not shown). However, noise from the media, or tape 204, may cause the apparent position of servo marks 206, comprising the servo data 202 to shift slightly in time, referred to in the art as "peak jitter". Peak jitter is random, but the mean time difference between peaks can be improved by writing more servo marks 206 to the tape 204 within a given length of tape 204.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A write head for writing servo data to a magnetic tape, the write head comprising:
   a planar bottom pole on a substrate, the bottom pole having a pole segment on either end thereof;
   a conductive coil having a plurality of turns around the bottom pole and extending between the pole segments;
   an insulation layer above the coil;
   a top pole on the insulation layer and pole segments and planar to the bottom pole, the top pole having a width approximately equal to a width of a servo track of the magnetic tape and a planar top surface; and
   more than one write gap in the top pole at an angle relative to a transverse axis of the write head for writing timing-based servo data to the servo track of the tape, each write gap of the more than one write gap formed with a narrow region less than 1.0 micrometers wide adjacent to the planar top surface of the top pole and a widened portion for focusing magnetic flux flowing across the write gap through the narrow region for writing servo data to the servo track of the tape.

2. The write head of claim 1 wherein the more than one write gap are in a chevron pattern in the top pole for writing servo pattern data in the servo track of the magnetic tape.

3. The write head of claim 1 wherein the narrow region of each write gap is less than 0.3 micrometers wide.

4. The write head of claim 1 wherein the top pole further comprises:
   first, second and third pole material islands, the pole material islands patterned to form a write gap of a predetermined width between adjacent islands.

5. A thin-film servo write head for writing servo data to a magnetic tape, the servo write head comprising:
   a planar magnetic bottom pole on a substrate;
   a pole segment on each end of the magnetic bottom pole;
   a coil having a plurality of turns around the bottom pole and extending between the pole segments, the coil generating a magnetic field when electrical current is applied thereto;
   an insulation layer over the coil providing reluctance to the magnetic field generated by the coil;
   a magnetic top pole above the insulation layer and pole segments and planar to the bottom pole, the top pole configured with a planar top surface to provide a planar tape bearing surface; and
   a plurality of write gaps in the top pole and at different angles relative to a transverse axis of the write head for writing timing-based servo data to a servo track of the magnetic tape, each of the plurality of write gaps formed with a widened portion and a narrow region, the widened portion focusing magnetic flux flowing across the write gap through the narrow region for writing servo data to the servo track of the magnetic tape.

6. The thin-film servo write head of claim 5 wherein the top pole further comprises:
   first, second, and third pole material islands, the pole material islands patterned to form a write gap between adjacent pole material islands.

7. The thin-film servo write head of claim 6 wherein the write gap formed between adjacent pole material islands has a narrow region and a widened portion, the widened portion focusing magnetic flux flowing across the write gap through the narrow region, the narrow region formed with a width of less than 0.3 micrometers for writing servo data to the servo track of the tape.

8. The thin-film servo write head of claim 5 wherein the top pole further comprises:
   a first pole portion above the insulation layer and coupled to one of the pole segments;
   a second pole portion above the insulation layer and coupled to a remaining one of the pole segments;
   a planar first pole material island on the first pole portion;
   a planar second pole material island on the second pole portion; and
   a planar third pole material island interposed between the first and second pole material islands and above the insulation layer and planar to the bottom pole, the pole material islands patterned to form a write gap between adjacent pole material islands, such that the write gaps are in a chevron pattern relative to a transverse axis of the write head for writing timing-based servo data to the servo track of the tape, a narrow region of each write gap formed with a width of less than 0.3 micrometers for writing servo data to the servo track of the tape.

9. The thin-film servo write head of claim 8 wherein the pole material islands are formed with a planar top surface, the planer top surface of the pole material islands providing the planar tape bearing surface of the write head.

* * * * *